United States Patent [19]

Braseth et al.

[11] Patent Number: 5,701,473
[45] Date of Patent: Dec. 23, 1997

[54] SYSTEM FOR OPTIMALLY STORING A DATA FILE FOR ENHANCED QUERY PROCESSING

[75] Inventors: David L. Braseth, Lino Lakes; Glen P. Eiden, Oak Grove; Ronald Q. Smith, St. Paul, all of Minn.

[73] Assignee: Unisys Corporation, Blue Bell

[21] Appl. No.: 406,278

[22] Filed: Mar. 17, 1995

[51] Int. Cl.$^6$ .................................................. G06F 17/30
[52] U.S. Cl. ..................... 395/621; 395/601; 395/603; 395/616; 395/112.04; 395/674
[58] Field of Search .................................... 395/600, 650, 395/601, 603, 616, 182.04, 621, 674; 371/40.1

[56] References Cited

U.S. PATENT DOCUMENTS

| | | | |
|---|---|---|---|
| 4,648,036 | 3/1987 | Gallant | 364/300 |
| 4,993,030 | 2/1991 | Krakauer et al. | 371/40.1 |
| 5,148,432 | 9/1992 | Gordon et al. | 371/10.1 |
| 5,179,702 | 1/1993 | Spix, Jr. et al. | 395/650 |
| 5,280,612 | 1/1994 | Lorie et al. | 395/600 |
| 5,287,494 | 2/1994 | Chen et al. | 393/600 |
| 5,287,496 | 2/1994 | Chen et al. | 395/600 |
| 5,317,731 | 5/1994 | Dias et al. | 395/600 |
| 5,325,525 | 6/1994 | Shan et al. | 395/650 |
| 5,333,305 | 7/1994 | Neufeld | 395/575 |
| 5,345,585 | 9/1994 | Iyer et al. | 395/600 |
| 5,367,675 | 11/1994 | Cheng et al. | 395/600 |

OTHER PUBLICATIONS

The Tandem Performance Group, "A Benchmark of Non-Stop SQL on the Debit Credit Transactions", Feb. 1988, Chicago.

David P. Anderson & Yoshitomo Osawa, "A File System for Continuous Media", ACM Transactions on Computer Systems, vol. 10, No. 4, pp. 311–337, Nov. 1992.

Jim Gemmell et al., "Principles of Delay-Sensitive Multimedia Data Storage & Retrieval", ACM Tranactions on Information Systems, vol. 10, No. 1 pp. 51–90, Jan. 1992.

A.L. Narashimha Reddy et al., "I/O Issues in a Multimedia System", IEEE, pp. 69–74, Mar. 1994.

P. Venkat Rangan, "Designing File Systems for Digital Video and Audio", ACM pp. 81–94, Dec. 1991.

Chan, A. et al. "The Implementation of an Integrated Concurrency Control and Recovery Scheme, " Jun. 1992, Orlando.

The Tandem Performance Group, "A Benchmark of Non-Stop SQL on the Debit Credit Transactions," 1988, Chicago.

Stearns, R.E., et al. "Distributed Database Concurrency Controls Using Before-Values," Apr. 1981, Ann Arbor.

Bayer, R., et al. "Parallelism and Recovery in Database Systems," Jun. 1980, vol. 5, No. 2, pp. 139–156.

Robinson, J., et al. "Elimination of Lock Contention in Relational Databases Accessed by Read-Only Queries and On-Line Update Transaction," Jun. 1988, pp. 180–185.

Primary Examiner—Thomas G. Black
Assistant Examiner—Cheryl R. Lewis
Attorney, Agent, or Firm—Charles A. Johnson; Mark T. Starr

[57] ABSTRACT

Disclosed is a system for establishing storage of a data file. The stores the data file in a manner that reduces the time required to process a query against the data file. Storage of the data file is established on multiple disks. The disks are selected such that their combined data transfer rate meets or exceeds the rate at which a query processor is capable of processing a query.

13 Claims, 7 Drawing Sheets

SYSTEM FOR OPTIMALLY STORING A DATA FILE FOR ENHANCED QUERY PROCESSING

CROSS-REFERENCE TO CO-PENDING APPLICATIONS

The following related co-pending patent applications are assigned to the assignee of the present application:

*System for Parallel Reading and Processing of a File*, to Elke, et al., filed concurrently with the present application; and

*Concurret Transaction And Query Processing System*, to Bierma, et al., filed concurrently with the present application.

BACKGROUND

1. Field of the Invention

This invention relates generally to file management systems and more particularly to storage of data files for enhanced query processing performance.

2. Background Description

Businesses today recognize the importance of analyzing the information generated in their day-to-day operations for purposes of formulating plans for tomorrow's business. For example, the effectiveness of a current marketing campaign may be gauged according to the level of business activity. Therefore, it is likely that businesses will demand the most up-to-date information and demand that the information be immediately accessible. The most up-to-date business information may be desired because it may provide the best basis for formulating a business plan. Immediate accessibility is a requirement because competitive business pressures may require a rapid response.

One source of day-to-day business information is a database supporting a transaction processing system. The transaction database provides a repository for the most up-to-date information available. A useful example is an airline reservation system. The airline reservation database may provide insight to the flying habits of the airline's customers. While a wealth of useful information may be contained in the transaction database, gaining access to the information for the purpose of business planning may be extremely costly.

For the remainder of this specification, a particular request for access to a database will be classified as either a "transaction" or a "query." In a business example, a transaction might be a request for a seat reservation on a particular flight. In contrast, a query might be a request for all passengers who have specified vegetarian meals within the past year. A transaction typically involves access to a relatively small number of records of the database, whereas a query may involve access to thousands, or even millions of records. The duration of a transaction may be as short as a small fraction of a second. The duration of a query, on the other hand, may be minutes or even hours, depending upon the query and the size of the database.

Existing transaction processing systems are engineered to handle the day-to-day business operations for a company. Emphasis is placed on maximizing transaction processing throughput and guaranteeing secure and reliable data. Thus, the structure of transaction databases does not lend itself to efficient processing of some queries.

Processing a query against a large transaction system database may be very time consuming. The duration of the query may be minutes or hours because millions of records may be processed from multiple database files. Traditional query optimization techniques seek to minimize the number of records processed but do little in terms of optimizing the processing of the remaining records. Some queries require reading every record in a database, and therefore are not suitable for query optimization.

One of the major factors in the time required to process a query is the time required to read a data file from the backing store. Traditionally, the processor manipulating the file data (such as searching the data) could process the data much faster than the data could be read from the backing store. Thus, the processor may be sitting idle while waiting for data to process. If the time required to read a file could be reduced, a corresponding reduction in query processing time would be realized.

SUMMARY OF THE INVENTION

In the co-pending patent application entitled, *System for Parallel Reading and Processing of a File*, one of the features that supports the parallel reading is the data file having been stored on multiple disks on multiple input-output channels. The parallel reading and processing of the data file provides vastly improved query processing performance. The present invention enhances query processing performance by providing an automated means by which storage of the data file is established on the multiple disks.

It is therefore an object of the invention to enhance query processing performance.

A further object of the invention is to automatically establish storage of a data file on multiple disks.

Another object of the invention is to automatically establish storage of a data file on multiple disks whereby the data file may be read from the disks at a rate that meets or exceeds the rate at which the data is processed.

Yet another object of the invention is to minimize disk usage in reading the data file by storing a portion of the data file in contiguous storage space on a particular disk.

A further object of the invention is to match the cumulative data transfer rate of the types of disks selected for storing the data file with the data processing rate of the type of processor that will process data from the data file.

These and other objects are achieved in a data processing system that includes a query processor for performing a query search of a data file. The data processing system includes multiple disks that are available for storage of the file, wherein the multiple disks are accessible via multiple control units. The data processing rate is the rate at which the query processor is capable of processing the data file. The data processing rate is obtained and used to determine the rate at which data must be transferred from the disks in order to keep the query processor busy processing the data without having to wait for data transfers.

The input-output channel configuration information and data transfer rates for the disks are obtained for the purpose of identifying a set of disks on which the data file may be stored. The combined data transfer rate of the disks that are selected for storage of the data file meets or exceeds the data processing rate of the query processor. If a new data file is being established, space is allocated on each of the selected disks for future storage of the data. If storage for an existing data file is being established, the data in the data file is saved, the file is then deleted and recreated by allocating space on each of the selected disks, and then the saved data is restored back into the file.

In another aspect of the invention, disk usage in processing a query is reduced by storing the portions of the data file in contiguous sections on the selected disks.

Still other objects and advantages of the present invention will become readily apparent to those skilled in the art from the following detailed description, wherein only the preferred embodiment of the invention is shown, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

DETAILED DESCRIPTION

Figure 1:
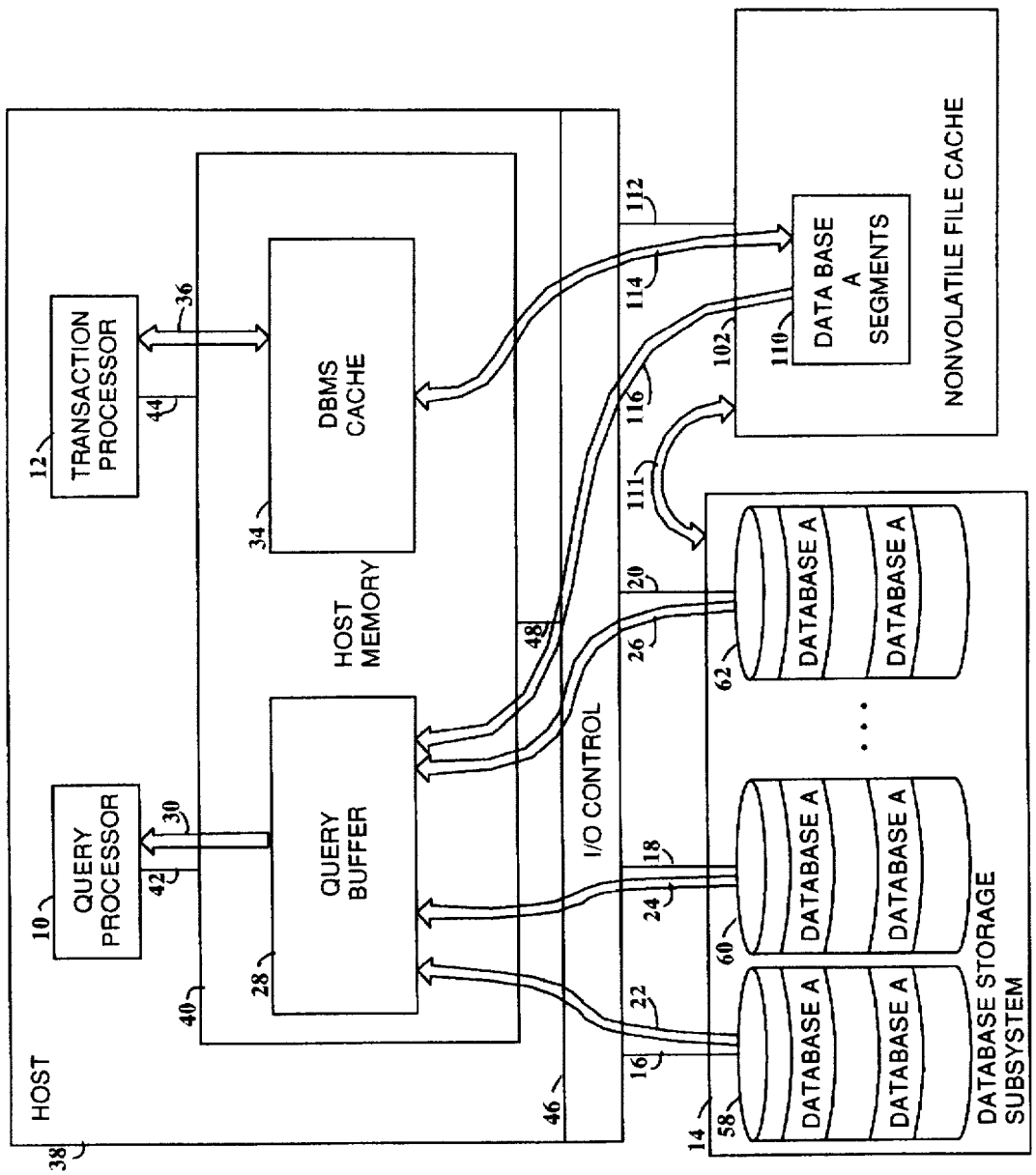
FIG. 1 is a functional block diagram of an exemplary system for which the present invention could be used to enhance query processing performance.

FIG. 1 is a functional block diagram of an exemplary system that supports concurrent processing of transactions and queries against a shared database. The system of FIG. 1 is shown to illustrate a system in which a Database data file, designated as Database A, is stored across multiple Disks to provide improved query processing performance. The present invention could be used to configure the exemplary system of FIG. 1.

Concurrent processing of transactions and queries is supported with two processors, Query Processor 10 and Transaction Processor 12. Transactions and queries are processed against the same Database A which is stored in a Database Storage Subsystem 14. Multiple Input/Output (I/O) Channels, referenced as 16, 18, and 20 provide parallel I/O of Database A, where Database A is stored on multiple devices that are accessible via the multiple I/O Channels. Lines 22, 24, and 26 illustrate the parallel flow of data from the Database Storage Subsystem 14 to a Query Buffer 28. Line 30 illustrates the flow of data from the Query Buffer to the Query Processor. The parallel I/O over Channels 16, 18, and 20 provides data in the Query Buffer 28 at a rate that is fast enough to keep the Query Processor busy performing the search (without waiting for input data) according to the specified query, thereby providing improved query performance. The size of the Query Buffer and the number of parallel I/O requests that are issued allow control over how much the I/O demands of the Query Processor affect the transaction processing throughput for transactions processed by the Transaction Processor.

The Transaction Processor 12 processes transactions against portions of Database A in the DBMS Cache. Line 36 illustrates the bi-directional flow of data between the Transaction Processor and the DBMS Cache.

The system includes an exemplary Host 38, which is a data processing system that includes multiple instruction processors. A 2200 Series data processing system from Unisys Corporation serves as a suitable Host. The instruction processors are labeled as Query Processor 10 and Transaction Processor 12. Dual instruction processors provide a desired level of performance for concurrent processing of transactions and queries. The Transaction Processor may be dedicated to processing transactions while the Query Processor is dedicated to processing queries. While the system is illustrated with a Host that includes multiple processors with a shared memory, those skilled in the art will recognize that other hardware architectures, such as parallel and distributed systems could be adapted to achieve the results of the present invention and fall within the scope of the claims set forth herein.

Query Processor 10 and Transaction Processor 12 are respectively coupled to a shared Memory 40 via Lines 42 and 44. The manner of coupling could be either a direct or bussed connection. Lines 42 and 44 provide read and write access to the respective units.

The Database Storage Subsystem 14 is coupled to the I/O Control 46 section of the Host 38 via the Channels 16, 18, and 20. I/O Control is coupled to the Memory 40 via Line 48. Line 48 may provide either bussed or direct access to the Memory for the I/O Control. Coupling Line 48 permits I/O Contol to read from and write to Memory.

The exemplary Database Storage Subsystem 14 consists of multiple magnetic Disks, respectively referenced as 58, 60, and 62. One or more portions of Database A are stored on the multiple Disks. It is preferable that the Database be stored on as many Disks which are coupled to the Host 38 via as many I/O Channels as feasible. This allows greater parallelism in the reading of the Database from the Database Storage Subsystem, thereby providing data to the Query Processor as fast as the Query Processor can search the data.

The system provides improved transaction processing performance with the availability of a Nonvolatile File Cache 102. The Extended Processing Complex (XPC) is a commercially available product from Unisys Corporation which provides the functionality of the exemplary Nonvolatile File Cache.

The Nonvolatile File Cache 102 caches portions of Database A in its cache storage, thereby providing enhanced file access times when access to a portion of a file is requested and the requested portion is not in the DBMS Cache 34. Database A Segments 110 illustrates the cached portions of the Database A file. The term "segment" refers to the unit of allocable file storage by the file system software of the exemplary system. The term segment is used to refer to a unit of file storage allocated by a file management system, whereas a "page" is a unit of storage allocated by the DBMS for storing one or more records. Line 111 illustrates the bi-directional flow of data between the Nonvolatile File Cache 102 and the Database Storage Subsystem 14.

Enhanced file access time translates into increased transaction processing throughput. The Nonvolatile File Cache is coupled to the I/O Control section 46 of the Host 38 via Line 112. Preferably, the coupling Line 112 is physically distinct from coupling Lines 16, 18, and 20. Bi-directional Line 114 illustrates the flow of data between the DBMS Cache and the Nonvolatile File Cache. References to portions of Database A that are not in the DBMS Cache are directed to the Nonvolatile File Cache. If the requested portion is present in the Nonvolatile File Cache, the portion is transferred to the DBMS Cache. If a high hit rate is achieved in the DBMS Cache and in the Nonvolatile File Cache in processing transactions, I/O to the Database Storage Subsystem is minimized. This allows a high throughput rate for transactions and allows most of the I/O via coupling Lines 16, 18, and 20 to be for the Query Processor 10.

Line 116 illustrates the flow of data from the Nonvolatile File Cache 102 to the Query Buffer 28. Portions of Database A that are present in the Nonvolatile File Cache are merged with corresponding portions of Database A read from the Database Storage Subsystem 14. The merging of data from the Nonvolatile File Cache permits the most recent updates to Database A resulting from transactions processed by the Transaction Processor 12 to be considered by the Query Processor 10 in processing a query.

The system provides enhanced query performance with minimal impact to the transaction processing throughput rate. The storage of Database A across multiple Disks 58, 60, and 62 on multiple distinct I/O Channels 16, 18, and 20 provides data from Database A at a rate which is fast enough to keep Query Processor 10 busy. I/O requests are issued asynchronous to the processing of the query by the Query Processor. This combination results in a fast query execution.

The impact of processing a query on the rate of transaction processing throughput is minimized by having a second processor available to process the query and by having available a Nonvolatile File Cache 102. The Nonvolatile File Cache minimizes the contention between the Transaction Processor 12 and the Query Processor 10 for I/O resources. Contention is minimized because most of the portions of Database A that are referenced by transactions processed by the Transaction Processor are either present in the DBMS Cache 34 or in the Nonvolatile File Cache.

Figure 2:
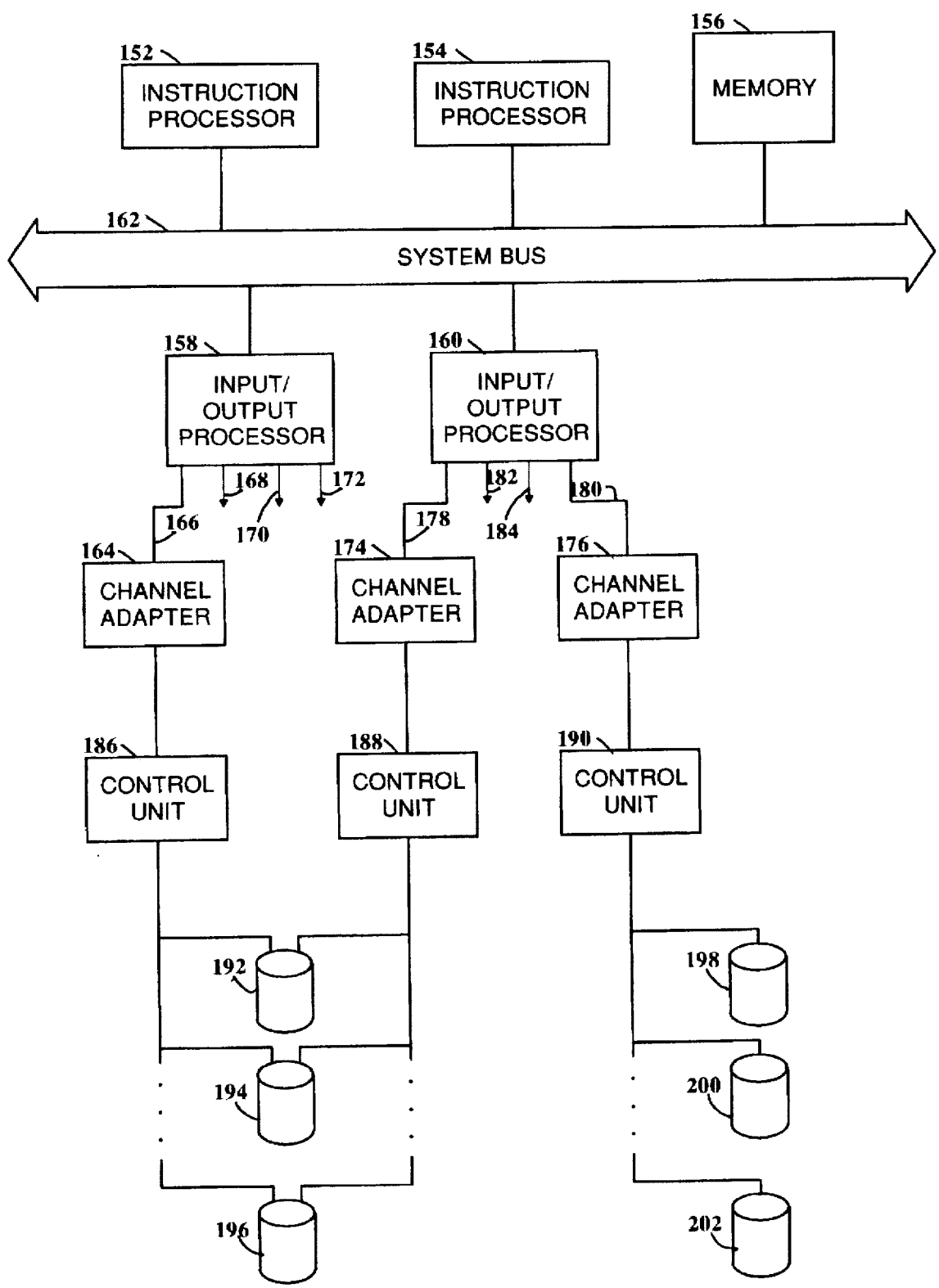
FIG. 2 is an exemplary Host system architecture along with multiple disk storage subsystems.

FIG. 2 is an exemplary Host system architecture along with multiple disk storage subsystems. The 2200/500 Series data processing system that is commercially available from Unisys adheres to such a system architecture. The system includes two Instruction Processors referenced as 152 and 154, a Memory 156, and two Input/Output Processors (IOPs) 158 and 160, coupled to a System Bus 162. Software executing on the Instruction Processors may initiate Input/Output (IO) requests to either of the IOPs. The IOPs control the flow of data input to and output from the system and have access to the Memory 156.

Each of the IOPs has four ports available for I/O channels. Channel Adapter 164 is coupled to IOP 158 via Line 166. Lines 168, 170, and 172 are shown to illustrate additional IO channels. IOP 160 is shown coupled to two Channel Adapters, 174 and 176, via Lines 178 and 180. Lines 182 and 184 illustrate the additional IO channels available on IOP 160. A Channel Adapter provides an interface for an IOP to devices accessible according to a specific protocol, such as Block Mux or SCSI. The exemplary Channel Adapters illustrate Block Mux channels. Other types of IO channels could be used in accordance with the present invention.

Each of the Channel Adapters 164, 174, and 176 coupled to its respective Control Unit, 186, 188, and 190. Each Control Unit provides access to its respective string of disks. Control Units 186 and 188 both provide access to Disks 192, 194, and 196. Thus, Disks 192, 194, and 196 are accessible via IOP 158 in combination with Channel Adapter 164, and accessible via IOP 160 in combination with Channel Adapter 174. Control Unit 190 provides access to Disks 198, 200, and 202.

Figure 3:
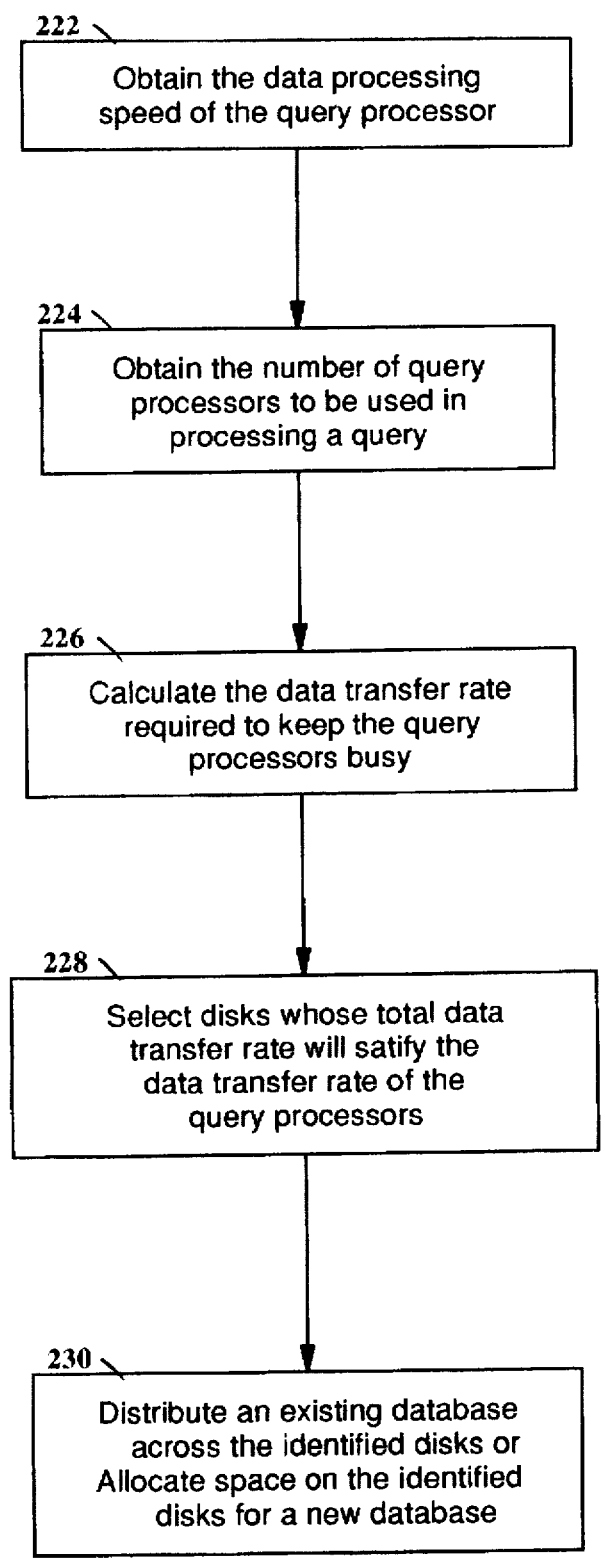
FIG. 3 is a flowchart of the overall processing for optimally storing a database file for enhancing query processing performance.

FIG. 3 is a flowchart of the general processing for optimally storing a database data file for enhancing query processing performance. The objective of the processing is to store the data file in a manner such that records of the data file are supplied to the instruction processor performing the query, i.e., the Query Processor 10, at a rate that meets or exceeds the rate at which the Query Processor is capable of processing the records. This is accomplished by storing the data file on a plurality of disks, thereby enabling the data to be read at a rate that meets or exceeds the processing rate of the Query Processor.

At Step 222, a determination is made as to the rate at which the Query Processor 10 is capable of processing records of the data file. This data processing rate may vary from processor type to processor type. The data processing rate is used to determine how many and which disks should be used to store the database file. Step 24 obtains the number of processors that may be used in processing the query. In a system having multiple instruction processors, more than one of the instruction processors may be used to process the query. The number of instruction processors, along with the type is used to calculate a total data transfer rate that is required to keep all the Query Processor(s) busy performing the query as shown by Step 226. The total data transfer rate is obtained by multiplying the number of instruction processors by the processing rate for the instruction processor type.

Step 228 involves selecting the Disks 192–202 which can satisfy the total data transfer rate required by the Query Processor(s) 10. This may be accomplished by summing the data transfer rate for a set of Disks where no pair of the Disks in the set is accessible via the same Control Unit 186, 188, or 190. If there are multiple types of Disks coupled to the Host 38, then the type of the Disk and an associated rate of data transfer must be identified.

Once a set of Disks 58, 60, and 62 is identified, storage for the data file may be established on the Disks in the set. If the data file already exists, then the file may be distributed across the set of Disks. If a new data file is being created, then the contemplated amount of space may be allocated in advance across the set of Disks as shown by Step 230.

Figure 4:
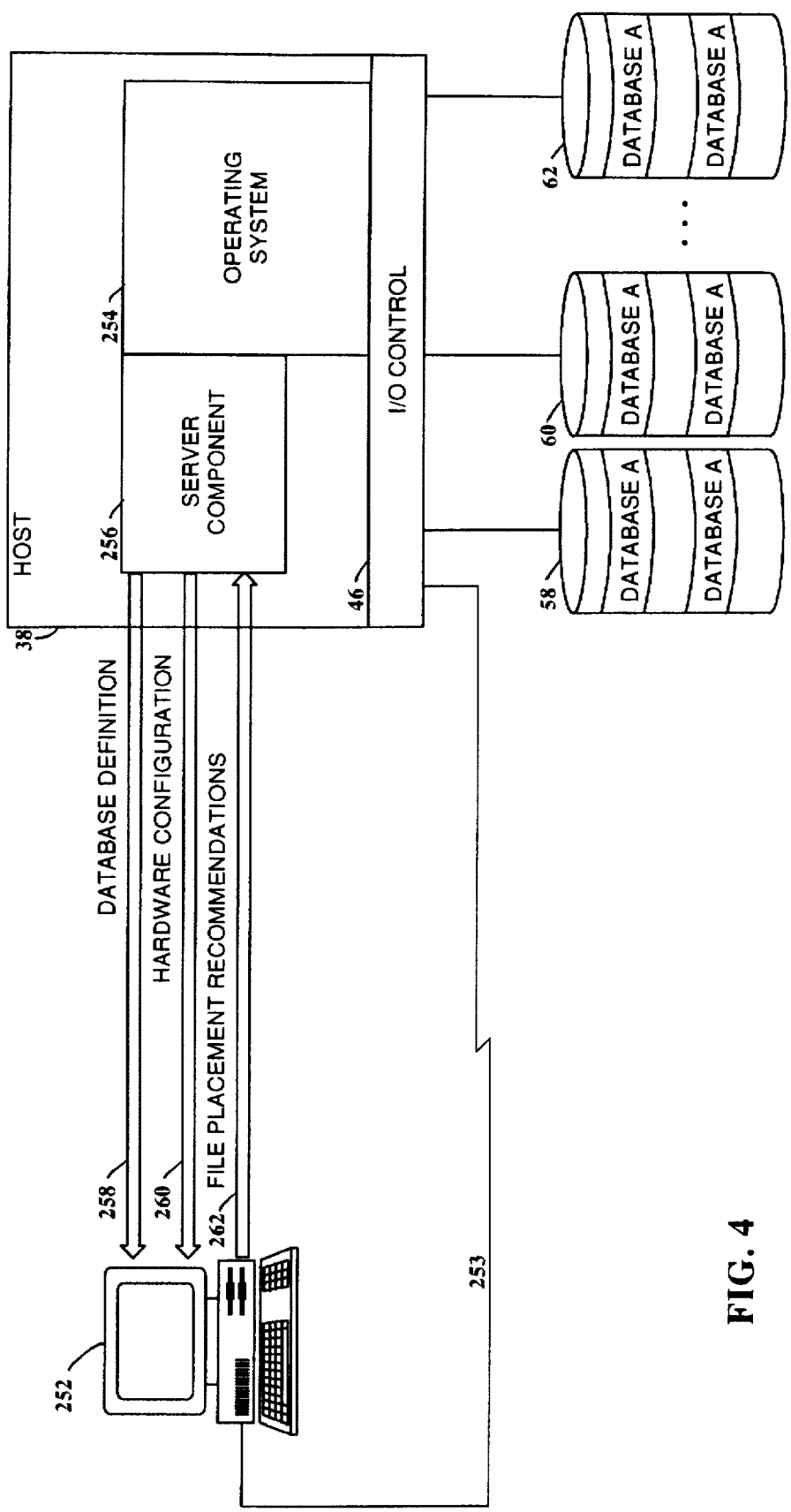
FIG. 4 is a functional block diagram of a system that optimally stores a database file for enhanced query processing.

FIG. 4 is a functional block diagram of an exemplary system that optimally stores a database data file for enhanced query processing. Optimizer Tool software executes on a Microcomputer 252 that is coupled to the Host 38 via a local area network as illustrated by Line 253. The Optimizer Tool solicits Host 38 configuration information from the Operating System 254 via a Server Component 256. The Server Component also provides database definition information to the Optimizer Tool for an existing database. For a database that is being created, the database definition may be entered at the Microcomputer 252. The Server Component is a computer program that cooperates with the Optimizer Tool in optimally storing the Database data files. Lines 258 and 260 respectively illustrate the flow of data from the Host 38 to the Optimizer Tool on the Microcomputer 252.

The Optimizer Tool on the Microcomputer 252 analyzes the hardware configuration and the database definition information from the Host 38 and generates data file placement recommendations that are sent to the Server Component 256. Line 262 illustrates the data flow of file placement recommendations from the Optimizer Tool to the Server Component. The file placement recommendations identify the particular Disks 58, 60, and 62 on which the Database is to be stored. The Server Component interacts with the Operating System 254 to determine whether there is adequate space available on the Disks to store the data file, and if so, distribute or allocate space for the Database.

Figure 5:
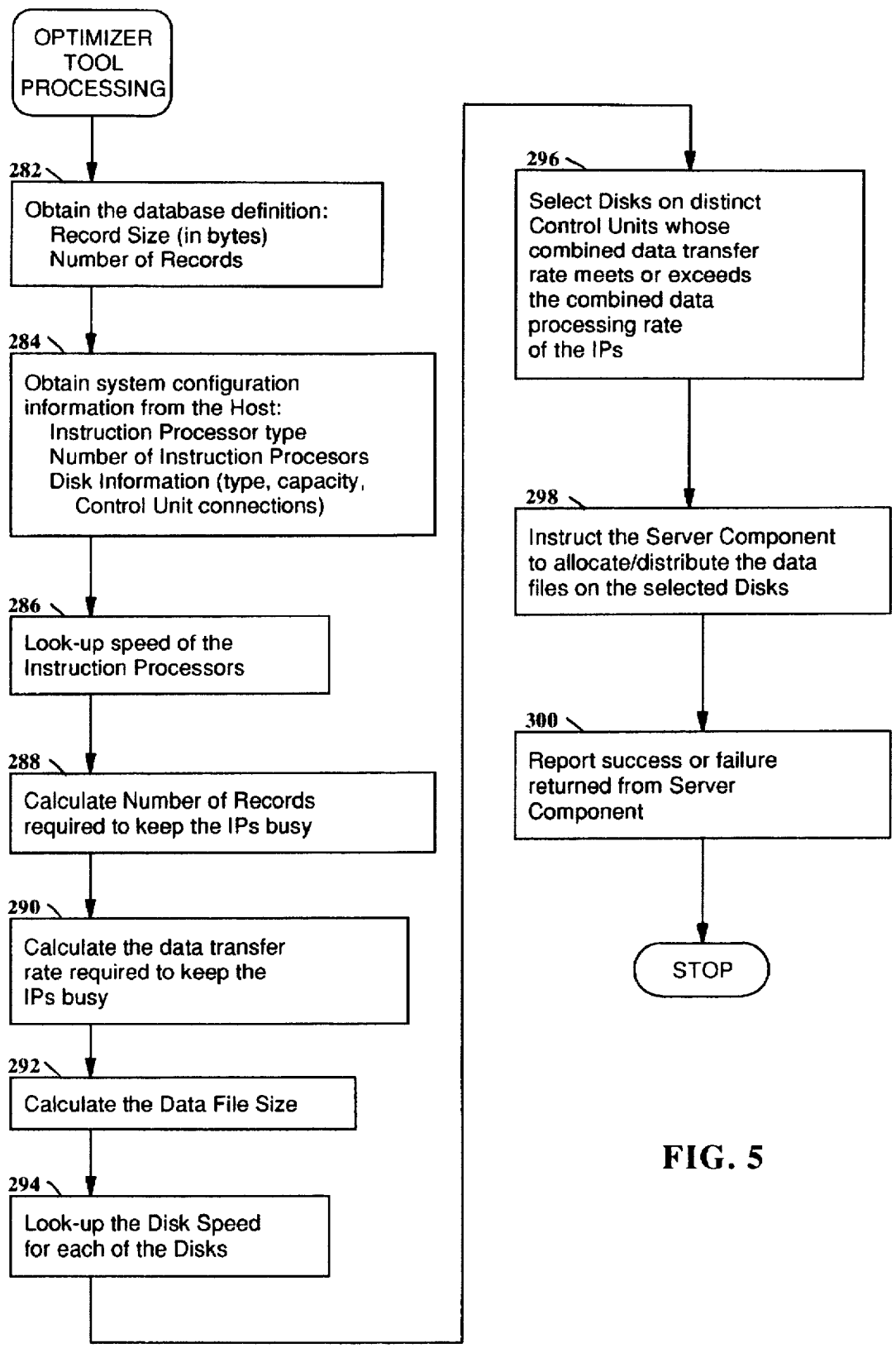
FIG. 5 is a flowchart of the Optimizer Tool processing.

FIG. 5 is a flowchart of the Optimizer Tool processing. The Optimizer Tool processing obtains database definition and Host 38 configuration information, analyzes the information, and sends file placement recommendations to the Host. At Step 282, the database definition information is obtained. This information may be obtained from an externally generated Structured Query Language (SQL) file or from the database definition information that is available on the Host. From the database definition, the record size, in bytes, is calculated for each of the data files in the database. In addition, the existing or expected number of records is obtained, either from a database administrator or from existing configuration information.

Step 284 obtains the Host configuration information. This includes the type of Instruction Processors 152 and 154, the number of Instruction Processors, and Disk information such as for Disks 192–202. The Disk information includes the type, capacity, and Control Unit 186, 188, or 190 connections. The Instruction Processor information is used to determine the rate at which the Instruction Processors are capable of processing data. The Disk information is used to determine the rate at which Disks can supply data to the Instruction Processors for processing.

The speed of each of the Instruction Processors 152 and 154 is obtained at Step 286. In the exemplary 2200 Series system, the Host 38 system software maintains a record processing rate, the Record Rate, for the different types of Instruction Processors. At Step 288, the Record Rate, in records/minute, that would keep the Instruction Processor(s) busy is calculated. If there are multiple Instruction Processors available to process the query, then the Record Rate is multiplied by the number of Instruction Processors.

Based on the Record Rate and Record Size, Step 290 calculates the Required Data Transfer Rate, which is the data transfer rate that will keep the Instruction Processors busy; that is, the Instruction Processors will not have to sit idle while data is read from the Disks. The Required Data Transfer Rate in bytes/second is the (Record Rate /60)/Record Size, where Record Size is obtained from the database definition.

Step 292 calculates the Data File Size which is the size of the database data file. The Data File Size is the Record Size multiplied by the number of records in the data file. Step 294 obtains the Disk Speed by examining the type of the various Disks 192–202 in the system configuration. The Disk Speed is preestablished in bytes/second.

The number of Disks is calculated by selecting Disks on which to place the data file until the sum of their transfer rates equals or exceeds the required transfer rate to keep the Instruction Processors from having to wait for data. All of the disks for a single data file must be connected to different Control Units to avoid a data throughput bottleneck at the Control Unit level. In order to complete the set of selected Disks, no pair of Disks in the set may be accessible via a single shared Control Unit. For example, Disks 198 and 200 would not both be in the set of Disks selected at Step 296 because they are both accessible only via Control Unit 190.

If an adequate number of Disks is not available or there are not enough Control Units 186, 188, and 190 available to provide access to the Disks, then a warning is provided and the data file allocated across as many disks as are available on distinct Control Units. If there is not enough space to hold the data file, an error message is provided and creation of the database is aborted.

Once a set of Disks 58, 60, and 62 is selected, it must be verified that the data file will fit on the selected Disks. If the data file will not fit on the selected set of Disks, then another set of Disks is assembled. This process is repeated until a set of Disks is assembled on which the data file would fit. If such a set cannot be assembled, space for the data file is not allocated, and for an existing data file, the data file is not distributed across the set of Disks. Any data file that is less than approximately 0.9 megabytes is not distributed across multiple Disks because data files are allocated in contiguous blocks of at least 0.9 megabytes.

If a set of Disks is identified, Step 298 instructs the Server Component 256 on the Host 38 to allocate space for a new Database data file and create any additional Database structures that are required, or store an existing Database data file across the set of selected Disks. The Server Component interacts with the Operating System 254 to store the data file across the multiple Disks 58, 60, and 62. Step 300 reports a success or failure depending upon whether a set of Disks with adequate space was assembled and the Server Component was successful on allocating the file space.

The process of distributing a Database on a set of Disks, based on the speed of the Instruction Processors and speed of the Disks, is performed for each data file in the Database, thus optimizing each data file individually for maximum query performance.

Figure 6:
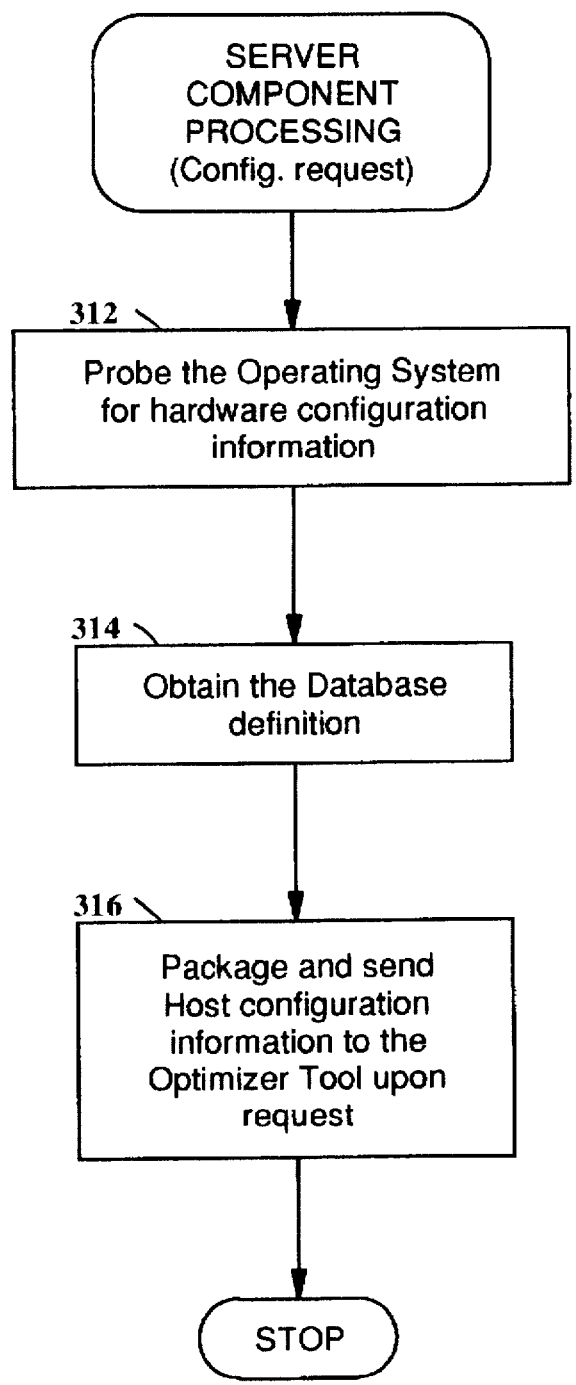
FIG. 6 is a flowchart of the Server Component processing for obtaining configuration information for the Optimizer Tool.

FIG. 6 is a flowchart of the Server Component processing for obtaining configuration information for the Optimizer Tool. The Server Component 256 provides configuration information to the Optimizer Tool on the Microcomputer 252 upon request.

Step 312 probes the Operating System 254 for system configuration information. In particular, the type and number of Instruction Processors, and the Disk information set forth in 284 is obtained. Step 314 obtains the database definition from a repository of database information. From the Database definition, the record size (in bytes) is calculated for each of the data files in the Database. If a new Database is being created, the database definition will be supplied via user interfaces on the Optimizer Tool Microcomputer 252.

Step 316 packages the system configuration information and database definition information from Steps 312 and 314 and sends the information to the Microcomputer 252 via the local area network connection 253.

Figure 7:
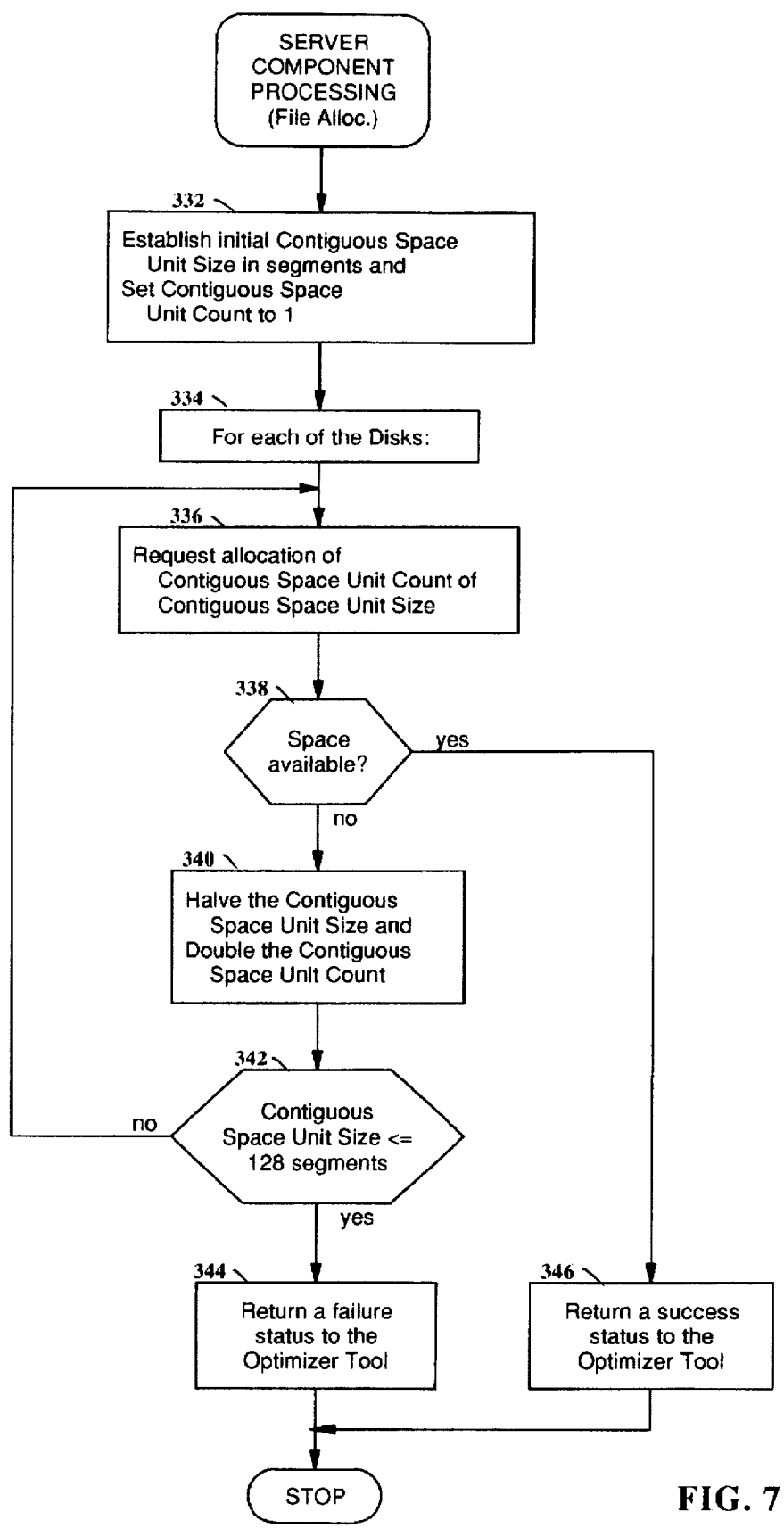
FIG. 7 is a flowchart of the processing performed by the Server Component to allocate space on the set of Disks selected for storage of a database data file.

FIG. 7 is a flowchart of the processing performed by the Server Component to allocate space on the set of Disks selected for storage of a database data file. The Server Component 256 attempts to allocate space in large contiguous blocks of storage on the Disks 58, 60, and 62. The Database data file is divided equally among the set of Disks selected by the Optimizer Tool. The Server Component first attempts to allocate a contiguous block of storage for the entire portion of the data file to be stored on a particular Disk, if a contiguous space of this size is unavailable, the portion is split in an attempt to allocate smaller contiguous spaces. In particular, the requested number of contiguous spaces is doubled and the amount of storage within a contiguous space is reduced by half. The process is repeated until the amount of contiguous storage space requested falls below 128 segments or all of the space has been allocated for the data file.

Step 332 establishes an initial Contiguous Space Unit Size and a Contiguous Space Unit Count. The initial Contiguous Space Unit Size is the size of the Database data file divided by the number of Disks 58, 60, and 62 across which the file may be stored. The Contiguous Space Unit Count is the number of contiguous spaces requested for each Disk and is initially set to one.

Step 334 specifies that for each of the Disks 58, 60, and 62, Steps 336–342 are to be performed. Step 336 requests allocation of the number of contiguous spaces specified by the Contiguous Space Unit Count of a size specified by the Contiguous Space Unit Size. If a particular Disk does not have the requested contiguous space available, Step 340 halves the Contiguous Space Size and doubles the Contiguous Space Unit Count (i.e., twice as many units of half the previous size) for the portion of the data file to be stored on that Disk.

If the requested Contiguous Space Unit Size falls below 128 segments for any of the Disks, decision Step 342 directs control to Step 344 where a failure status is returned from the file allocation processing to the Optimizer Tool on the Microcomputer 252. Otherwise, while the Contiguous Space Unit Size remains above 128 segments, control is returned to Step 336 to again try to allocate contiguous storage space.

Once it is established that adequate contiguous space is available on each of the Disks 58, 60, and 62, decision Step 338 directs control to Step 346. Step 346 reports a success status to the Optimizer Tool.

Having described an exemplary embodiment of the invention in the drawings and accompanying description, those skilled in the art will recognize that various modifications to the exemplary embodiment could be made without departing from the scope and spirit of the claims set forth below:

We claim:

1. In a data processing system having an instruction processor for performing a query against a database data file and a plurality of disks coupled to the data processing system and accessible to the instruction processor, a computer implemented method for automatically establishing storage for the data file for enhanced query processing performance, comprising the steps of:

obtaining a predetermined data rate, quantified as a predetermined unit of data per predetermined unit of time, at which an instruction processor is capable of processing a query against the database;

selecting a set of disks from the plurality of disks that are accessible to the instruction processor and that have a combined data transfer rate to the instruction processor that is greater than or equal to said data rate; and allocating storage for the data file on said set of disks.

2. The method of claim 1, wherein said allocating step includes the steps of:

dividing said data file into a plurality of portions; and allocating contiguous storage on each of said set of disks for a respective one of said plurality of portions.

3. The method of claim 2, further including the steps of:

dividing one portion of said plurality portions into subportions if contiguous space is not available for said one portion on a respective disk; and allocating contiguous storage for said one portion on said respective disk.

4. In a data processing system having a plurality of instruction processors for performing a query against a database data file and a plurality of disks coupled to the data processing system and accessible to each of the instruction processors, a computer implemented method for automatically establishing storage for the data file for enhanced query processing performance, comprising the steps of:

obtaining a predetermined data rate, quantified as a predetermined unit of data per predetermined unit of time, at which a single instruction processor is capable of processing a query against the data file;

obtaining a count of the plurality of instruction processors available to process a query;

determining a total data rate that is required to keep the plurality of instruction processors busy;

selecting a set of disks from the plurality of disks that are accessible to each of the instruction processors and that have a combined data transfer rate to the plurality of instruction processors that is greater than or equal to said total data rate; and allocating storage for the data file on said set of disks.

5. The method of claim 4, wherein said allocating step includes the steps of:

dividing said data file into a plurality of portions; and allocating contiguous storage on each of said set of disks for a respective one of said plurality of portions.

6. The method of claim 5, further including the steps of:

dividing one portion of said plurality portions into subportions if contiguous space is not available for said one portion on a respective disk; and allocating contiguous storage for said one portion on said respective disk.

7. In a data processing system having an instruction processor for performing a query against a database data file, and a plurality of disks coupled to the data processing system via a plurality of control units, wherein the plurality of disks are accessible to the instruction processor, a computer implemented method for automatically allocating storage of the data file for enhanced query processing performance, comprising the steps of:

obtaining a record size of a record in the database;

obtaining a record count of records in the database;

obtaining a predetermined data rate, quantified as a predetermined unit of data per predetermined unit of time, at which an instruction processor is capable of processing a query against the database;

obtaining disk data transfer rates for the plurality of disks;

selecting a set of disks from said plurality of disks that are accessible to the instruction processor and that have a combined data transfer rate to the instruction processor that is greater than or equal to said data processing rate, wherein each of said set of disks is coupled to a distinct one of said plurality of control units; and allocating storage for the data file on said set of disks.

8. The method of claim 7, wherein said allocating step includes the steps of:

dividing said data file into a plurality of portions; and allocating contiguous storage on each of said set of disks for a respective one of said plurality of portions.

9. The method of claim 8, further including the steps of:

dividing one portion of said plurality portions into subportions if contiguous space is not available for said one portion on a respective disk; and allocating contiguous storage for said one portion on said respective disk.

10. A system for establishing storage of a database data file for enhanced query processing performance, comprising:

a data processing system having an instruction processor;

a plurality of disks coupled to said data processing system and accessible to the instruction processor;

acquisition means interfaced with said data processing system for obtaining a predetermined data rate, quantified as a predetermined unit of data per predetermined unit of time, at which an instruction processor is capable of processing a query against the database;

selection means responsive to said acquisition means for selecting a set of disks from said plurality of disks that have a combined data transfer rate to the instruction processor that is greater than or equal to said data rate; and allocation means responsive to said selection means for allocating storage for the data file on said set of disks.

11. In a data processing system having an instruction processor for performing a query against a database data file and a plurality of disks coupled to the data processing system, a computer implemented method for automatically establishing storage for the data file for enhanced query processing performance in response to a request for data file establishment, the method comprising the steps of:

obtaining a predetermined data rate, quantified as a predetermined unit of data per predetermined unit of time, at which the instruction processor is capable of processing a query against the database;

selecting a set of disks from the plurality of disks, wherein said set of disks together are capable of transmitting data to the instruction processor at a rate that is approximately equal to said data rate; and allocating storage for the data file on said set of disks.

12. The method of claim 11, wherein said allocating step includes the steps of:

dividing said data file into a plurality of portions; and allocating contiguous storage on each of said set of disks for a respective one of said plurality of portions.

13. The method of claim 12, further including the steps of:

dividing one portion of said plurality portions into subportions if contiguous space is not available for said one portion on a respective disk; and allocating contiguous storage for said one portion on said respective disk.

\* \* \* \* \*